United States Patent
Elharrar

(10) Patent No.: US 8,654,966 B2
(45) Date of Patent: Feb. 18, 2014

(54) METHOD FOR DIAL PLAN PARSING AND A SYSTEM INCORPORATING THE SAME

(75) Inventor: Yair Elharrar, Ramat-Gan (IL)

(73) Assignee: AudioCodes Ltd., Lod (IL)

( * ) Notice: Subject to any disclaimer, the term of this patent is extended or adjusted under 35 U.S.C. 154(b) by 1890 days.

(21) Appl. No.: 11/657,058

(22) Filed: Jan. 24, 2007

(65) Prior Publication Data
US 2008/0175370 A1 Jul. 24, 2008

(51) Int. Cl.
*H04M 1/00* (2006.01)
*H04M 3/00* (2006.01)

(52) U.S. Cl.
USPC ............ 379/355.06; 379/142.06; 379/142.04; 379/142.14; 379/245; 379/355.07; 379/355.08; 379/200

(58) Field of Classification Search
USPC .................... 379/200, 355, 188, 199, 142.06, 379/142.04, 142.14, 245, 142.01, 355.06, 379/355.08, 355.07
See application file for complete search history.

(56) References Cited

U.S. PATENT DOCUMENTS

| | | | | |
|---|---|---|---|---|
| 4,724,521 A | * | 2/1988 | Carron et al. | 717/175 |
| 5,119,416 A | * | 6/1992 | Ortel | 379/213.01 |
| 5,812,651 A | * | 9/1998 | Kaplan | 379/200 |
| 5,887,058 A | * | 3/1999 | Kammath et al. | 379/284 |
| 6,167,126 A | | 12/2000 | Janning | |
| 6,195,427 B1 | * | 2/2001 | Hansen et al. | 379/352 |
| 6,324,272 B1 | * | 11/2001 | Abu-Shukhaidem et al. | 379/142.06 |
| 6,449,475 B1 | * | 9/2002 | Chinnaswami | 455/415 |
| 6,760,420 B2 | * | 7/2004 | Heilmann et al. | 379/189 |
| 6,813,344 B1 | * | 11/2004 | Lemke | 379/142.06 |
| 7,046,778 B2 | * | 5/2006 | Martin et al. | 379/201.01 |
| 7,113,585 B1 | * | 9/2006 | Breckenridge | 379/356.01 |
| 7,142,644 B2 | * | 11/2006 | Lockwood | 379/88.12 |
| 7,457,279 B1 | * | 11/2008 | Scott et al. | 370/352 |
| 7,778,400 B2 | * | 8/2010 | Nasiri et al. | 379/142.01 |
| 7,852,996 B2 | * | 12/2010 | Lemke | 379/142.06 |
| 2002/0097855 A1 | * | 7/2002 | Neudeck et al. | 379/201.01 |
| 2003/0165226 A1 | * | 9/2003 | Vu et al. | 379/221.01 |
| 2004/0042613 A1 | * | 3/2004 | Phillips, III | 379/350 |
| 2004/0042614 A1 | * | 3/2004 | Shah et al. | 379/355.01 |
| 2006/0182263 A1 | * | 8/2006 | Phillips, III | 379/350 |
| 2008/0037758 A1 | * | 2/2008 | Saito et al. | 379/220.01 |
| 2008/0159516 A1 | * | 7/2008 | Freeman | 379/221.14 |
| 2009/0161860 A1 | * | 6/2009 | Patadia et al. | 379/418 |
| 2010/0008491 A1 | * | 1/2010 | Nahum | 379/216.01 |
| 2010/0111289 A1 | * | 5/2010 | Fallen-Bailey | 379/355.09 |
| 2012/0135721 A1 | * | 5/2012 | Gao | 455/414.1 |
| 2013/0297641 A1 | * | 11/2013 | Shinjo et al. | 707/758 |

OTHER PUBLICATIONS

ITU-T Recommendation H.248.1 "Gateway Control Protocol".
"Fast Pattern Matching in Strings", SIAM Journal on Computing 6, 1977, by D.E. Knuth, J. Morris and V. Pratt.

* cited by examiner

*Primary Examiner* — Lisa Hashem
(74) *Attorney, Agent, or Firm* — Eitan, Mehulal & Sadot

(57) ABSTRACT

A method and system for a dial plan parser includes a state machine configured upon a dial plan to which is applied call signaling data, and a call routing module/switch to transfer a call to a next point.

20 Claims, 10 Drawing Sheets

|       | Rule | Len   | #0  | #1  | #2  | #3  | #4  | #5  | #6  | #7  | #8  | #9  | *   | #   |             |
|-------|------|-------|-----|-----|-----|-----|-----|-----|-----|-----|-----|-----|-----|-----|-------------|
| 799 — | 0:   | (KEEP,| 1,  | 7,  | 17, | 17, | 17, | 17, | 17, | 17, | 17, | 17, | 18, | 0 ) |             |
| 750 — | 1:   | (KEEP,| 2,  | 0,  | 3,  | 3,  | 3,  | 4,  | 0,  | 5,  | 0,  | 0,  | 0,  | 0 ) |             |
| 760 — | 2:   | (14,  | 0,  | 0,  | 0,  | 0,  | 0,  | 0,  | 0,  | 0,  | 0,  | 0,  | 0,  | 0 ) INTERNATIO |
| 761 — | 3:   | (7,   | 0,  | 0,  | 0,  | 0,  | 0,  | 0,  | 0,  | 0,  | 0,  | 0,  | 0,  | 0 ) LANDLINE |
| 768 — | 4:   | (8,   | 0,  | 0,  | 0,  | 0,  | 0,  | 0,  | 0,  | 0,  | 0,  | 0,  | 0,  | 0 ) CELLULAR |
| 755 — | 5:   | (KEEP,| 0,  | 0,  | 0,  | 0,  | 0,  | 0,  | 0,  | 6,  | 0,  | 0,  | 0,  | 0 ) |             |
| 765 — | 6:   | (7,   | 0,  | 0,  | 0,  | 0,  | 0,  | 0,  | 0,  | 0,  | 0,  | 0,  | 0,  | 0 ) CABLE |
| 751 — | 7:   | (KEEP,| 8,  | 8,  | 8,  | 8,  | 8,  | 8,  | 8,  | 9,  | 12, | 15, | 0,  | 0 ) |             |
| 761 — | 8:   | (1,   | 0,  | 0,  | 0,  | 0,  | 0,  | 0,  | 0,  | 0,  | 0,  | 0,  | 0,  | 0 ) SPECIAL |
| 752 — | 9:   | (KEEP,| 0,  | 0,  | 0,  | 0,  | 0,  | 10, | 0,  | 0,  | 0,  | 0,  | 0,  | 0 ) |             |
| 753 — | 10:  | (KEEP,| 11, | 0,  | 0,  | 0,  | 0,  | 0,  | 0,  | 0,  | 0,  | 0,  | 0,  | 0 ) |             |
| 754 — | 11:  | (KEEP,| 2,  | 0,  | 0,  | 0,  | 0,  | 0,  | 0,  | 0,  | 0,  | 0,  | 0,  | 0 ) |             |
| 757 — | 12:  | (KEEP,| 13, | 0,  | 0,  | 0,  | 0,  | 0,  | 0,  | 0,  | 0,  | 0,  | 0,  | 0 ) |             |
| 758 — | 13:  | (KEEP,| 14, | 0,  | 0,  | 0,  | 0,  | 0,  | 0,  | 0,  | 0,  | 0,  | 0,  | 0 ) |             |
| 768 — | 14:  | (7,   | 0,  | 0,  | 0,  | 0,  | 0,  | 0,  | 0,  | 0,  | 0,  | 0,  | 0,  | 0 ) TOLLFREE |
| 756 — | 15:  | (KEEP,| 0,  | 0,  | 0,  | 0,  | 0,  | 0,  | 0,  | 0,  | 16, | 0,  | 0,  | 0 ) |             |
| 767 — | 16:  | (0,   | 0,  | 0,  | 0,  | 0,  | 0,  | 0,  | 0,  | 0,  | 0,  | 0,  | 0,  | 0 ) SPECIAL |
| 769 — | 17:  | (6,   | 0,  | 0,  | 0,  | 0,  | 0,  | 0,  | 0,  | 0,  | 0,  | 0,  | 0,  | 0 ) LOCAL |
| 759 — | 18:  | (KEEP,| 0,  | 7,  | 0,  | 0,  | 0,  | 0,  | 0,  | 0,  | 0,  | 8,  | 0,  | 0 ) |             |

FIGURE 7

METHOD FOR DIAL PLAN PARSING AND A SYSTEM INCORPORATING THE SAME

FIELD OF THE DISCLOSURE

The present disclosure relates generally to the field of telecommunications. More specifically, the present disclosure relates to a method for improving the performance of a telecommunications network by the incorporation of a system for parsing telephone dial plans

BACKGROUND

The structure of a typical telephone number may generally include an access code, a country code, an area code, and a local number. Depending on the type of call, whether intercontinental, country to country, region to region, area to area, or even local, all the digits making up a telephone number may or may not be required to be dialed, depending on the particular telephone dial plan of each specific country. Special services such as police, emergency medical help, fire department, information services, and the like may have their own particular sets of digits that must be dialed to access such services.

A telephone dial plan, hereinafter referred to as a dial plan, is a plan which defines the expected number of digits to be dialed for a telephone number and the pattern of digits required when dialing the telephone number. The dial plan, generally based on a telephone number plan, includes the access codes, country codes, area codes and all combinations of digits which may be dialed when dialing a telephone number. In a telephone numbering plan, telephone number ranges are allocated to countries, regions, areas and local exchanges, to mobile phone networks, and to special services such as the police or public information services among others.

An access code is that part of a telephone number dialed only when dialing international and national (non-local domestic) calls, and is often used as if it were part of the telephone number. Typically, the most common national access code is "0", and the most common international access code "00", although in the United States and Canada, "1" and "011" are used, respectively.

A country code is that part of the telephone number dialed only when dialing to telephones in other countries. It is often used together with an international access code which must precede it in the dial string.

An area code is that part of a telephone number dialed from outside the code area and generally also from mobile phones. Area codes generally refer to geographical areas within one country that are covered by perhaps hundreds of telephone exchanges, including Private Branch Exchanges (PBX) and Private Automatic Branch Exchanges (PABX), all of which may also be referred to hereinafter as a telephone switch or a gateway, and are usually preceded in the dial string by either the national access code or the international access code and country code depending on the origin of the call.

A local number is that part of the telephone number identifying the final destination of a telephone call and must always be dialed in its entirety. The first few digits in the local number typically indicate smaller geographical areas or individual telephone exchanges. In mobile networks they generally indicate the original network provider. When calling from a telephone number in a given area or country code to another telephone in the same given area or country code usually, it is sufficient just to dial the local telephone number so that shorter dial strings are used.

As the numbers of telephones grow worldwide, there is an increasing demand for a telephone numbering plan which standardizes the various access codes, area codes and special services available in every region. Generally, the area codes are used to partition groups of subscribers within a certain area, and access codes are used to allow routing a call to a specific destination. International dialing complicates the scheme further—every country handles this issue differently; in the USA, for instance, federal regulations specify exactly how many digits there are in an area code and in a phone number—and in some Asian countries regulation is rather permissive Phone numbers can be as short as 1 digit and as long as 30 or more digits, depending on the network location of the caller.

The International Telecommunications Union (ITU), based in Geneva, Switzerland, is an international organization established in an effort to standardize and regulate international radio and telecommunications. Its main tasks are to promote and develop standardization, allocation of the radio spectrum, and organizing interconnection arrangements between different countries to allow international phone calls. The ITU is responsible for issuing recommendations which essentially serve as standards to be adopted by all countries participating in the ITU, although in reality the countries are not required to adopt the recommendations.

Although the ITU has attempted to promote common standards among the participating countries, telephone numbering plans take different formats in different parts of the world. For example, the ITU recommends that member states adopt "00" as their international access code, however, the United States, Canada, and other countries and territories participating in the North American Numbering Plan (NANP) have not accepted this format. The ITU international telephone numbering plan, through the E.164 standard, regulates country codes at the international level and sets a maximum length limit on a full international phone number. However, each country is responsible for defining the numbering system within its own network. As a result, regional area codes may have a fixed length (for example, 3 digits in the United States and Canada; 1 digit in Australia) or may have a variable length (for example, between 2 and 5 in Germany and in Austria; between 1 and 3 in Japan; 1 or 2 in Israel), or may even be incorporated into the subscriber's number, as is the case in many countries, such as Spain or Norway (for example, a local number in Madrid includes "91" which is also the area code). In some cases a trunk code, typically "0", must still be dialed, as in Belgium, Italy, Poland, Sweden, Switzerland and South Africa.

A closed telephone numbering plan is one in which the subscriber's number is a standard length, and is used for all calls, even in the same area. Such a plan, for example as may be found in North America, includes fixed length area codes and fixed length local numbers. An open telephone numbering plan, still visible in many countries which have not adopted any standardization procedures, typically includes variable length area codes and/or local numbers.

An open dialing plan is one in which there are different dialing arrangements for local and for long distance telephone calls. For local calls, identified by those telephone numbers containing the same area code, callers need only dial the number, but for calls outside the area, identified by those telephone numbers having a different area code, dialing of the area code is required. The area code is generally prefixed by a trunk code (usually "0"), which is usually omitted when calling from outside the country.

To call a number in Amsterdam in the Netherlands for example:

| | |
|---|---|
| xxx xxxx | (within Amsterdam - no area code required) |
| (020) xxx xxxx | (outside Amsterdam) |
| +31 20 xxx xxxx | (outside the Netherlands) |

In the United States, Canada, and other countries or territories using the North American Numbering Plan (NANP), the trunk code is '1', which is also (by coincidence) the country calling code. To call a number in San Francisco, the dialing procedure will vary:

| | |
|---|---|
| xxx xxxx | (local calls, no area code required) |
| 1 415 xxx xxxx | (outside San Francisco) |
| 415 xxx xxxx | (mobile phones within NANP) |
| +1 415 xxx xxxx | (calls from outside NANP) |

However, in parts of North America, where a new area code overlays an older area code, dialing 1+area code is now required even for local calls, which means that the NANP is now closed in certain areas and open in others. Dialing from mobile phones is different in that the trunk code is not necessary.

A closed dialing plan is one in which the subscriber's number is used for all calls, such that the area code is integrated as part of the telephone number even if the call is local. The emphasis nowadays, in a closed dialing plan, is to make all numbers a standard length, and incorporate the area code into the subscriber's number. This usually makes the use of a trunk code unnecessary. For example, to call Oslo in Norway before 1992, one would dial (open dialing plan):

| | |
|---|---|
| xxx xxx | (within Oslo - no area code required) |
| (02) xxx xxx | (within Norway - outside Oslo) |
| +47 2 xxx xxx | (outside Norway) |

After 1992, this changed to a closed eight-digit numbering plan (closed dialing plan):

| | |
|---|---|
| 22xx xxxx | (within Norway - including Oslo) |
| +47 22xx xxxx | (outside Norway) |

In other countries, such as France, Belgium, Switzerland, and South Africa, the trunk code is retained for domestic calls, whether local or national:

Paris 01 xx xx xx xx (outside France +33 1 xx xx xx xx)

Telephone exchanges, or switches, make routing decisions of voice and/or data based on the dialed telephone number. A phone call will typically go through several switches before reaching its destination, and a typical switch normally handles thousands of dialing attempts concurrently. Communication between switches is performed using various standard protocols, such as Channel-Associated-Signaling (CAS), or Common Channel Signaling (CCS), which includes Signaling System #7 (SS7) and Integrated Services Digital Network (ISDN), or two-wire analog telephone lines; each of these protocols specifies a different method for transmitting the dialed number from one switch to the next.

Channel Associated Signaling (CAS) is a form of digital communications signaling. As with most telecommunication signaling methods, it uses routing information to direct the voice and/or data to its destination. With CAS signaling, this routing information is encoded and transmitted in the same channel as the voice and/or data. This information can be transmitted in the same band (in-band signaling) or a separate band (out-of-band signaling) to the voice and/or data.

In-band signaling is the sending of control signals, including routing information, over the same channel as which the voice and/or data is being transmitted. Out-of-band signaling is the sending of control signals, including routing information, on a separate channel to that (or those) through which the voice and/or data is being transmitted. Out-of-band signaling is the signaling method used for ccS.

Signaling System #7 (SS7) is a standardized telephone communications protocol used to set up all the telephone calls among all the world's telephone networks, better known as the public switched telephone network (PSTN). SS7 provides a common structure for telephone network signaling, messaging, interfacing, and network maintenance. It deals with establishment of a call, exchanging user information, call routing, different billing structures, and supports other varied telecommunications services, including linking VoIP (voice-over-internet protocol) to the PSTN and in mobile phone voice and data applications.

Integrated Services Digital Network (ISDN) is a circuit-switched telephone network system whereby digital transmission of voice and data can be simultaneously done over a regular telephone line at a greater speed and better quality compared to analog transmission. ISDN specifically defines a set of protocols for establishing and breaking circuit switched connections over the PSTN, and for providing advanced call features for the user, including voice, fax, data and video capabilities.

Many of the protocols used in the PSTN, particularly those associated with CAS, with transmission over analog telephone lines, with VoIP, and others, do not necessarily mandate a method for detecting the end of the dial string. Digits are transmitted sequentially and the receiving switch must collect them, identify the phone number, and make the appropriate routing decision. Since it is not possible to tell the length of the dialed phone number, every switch employs a dialing time-out and processes the dialed number after a pause in dialing which may last up to several seconds. The following is a general description of the scenario by which a telephone call between two parties advances along the PSTN network:

a. A caller will pick up the telephone and will dial the telephone number of the receiver. If the receiver is in another area code usually the area code of the receiver will be dialed together with the local number. If the receiver is in another country then the country code will be added also and maybe some access code will also be required, particularly if going to another continent.

b. The call will usually first be transferred to a local telephone exchange in the same area as the caller. After a timeout period which indicates the end of the dial string the call will be transferred to a regional telephone exchange where, after another timeout period to determine the end of the dial string, the call may be transferred to a national telephone exchange (if going to another country).

c. After an additional timeout at the national telephone exchange to verify end of dial string the call is transferred to a continental telephone exchange if the call is going outside the continent, where there is an additional timeout to verify end of dial string.

d. The call is then transferred to the receiving continental telephone exchange where there is another timeout to verify the end of the dial string, and subsequently transferred in an inverse manner down to the receiving national telephone exchange, receiving regional telephone exchange and receiving local telephone exchange, and finally to the receiver, all with the respective timeouts required to detect the end of the dial string at each exchange.

When the call is routed through several switches, the timeouts accumulate to form slow end-to-end response times. This problem may cause revenue loss to telephone carriers forcing them to adopt corrective measures in an effort to minimize losses.

As a possible corrective measure for the accumulated timeout most telephone carriers are able to produce a rule-database consisting of the possible number patterns required by the numerous telephone numbering plans available worldwide covering the different countries. Some switches can be configured with this database, however traversing this database and comparing the digits dialed by the caller is a difficult task which consumes large amounts of memory and processing resources. Conceptually, it is possible to program the gateway in question with all possible area codes and phone number lengths. This requires that the switching equipment supplier supply a preconfigured gateway to the carrier company equipped with all the necessary equipment and infrastructure as may be required to identify all possible phone numbers. The main disadvantage of this approach is cost and maintenance—since telephone numbering plans and dial plans change with time, the equipment supplier needs to constantly replace the gateway or parts of it; which is usually not satisfactorily accepted by a telephone carrier.

U.S. Pat. No. 6,167,126, "Method for Flexibly Provisioning Switching Devices and a Switching Device Incorporating the Same", the disclosure of which is incorporated herein by reference in its entirety, describes a programming language which allows field-programming of the dial plan.

ITU-T Recommendation H.248.1 "Gateway Control Protocol", which is incorporated herein by reference in its entirety, describes a DigitMap descriptor as "a dialing plan resident in the Media Gateway used for detecting and reporting digit events received on a Termination."

D. E. Knuth, J. Morris and V. Pratt, Fast Pattern Matching in Strings, SIAM Journal on Computing, 6, 1977, which is incorporated herein by reference in its entirety, especially at pages 189-195, describes a method by which the KMP string searching algorithm is used for comparing incoming digit streams with a predefined finite state-machine.

A finite state machine is a model of behavior extensively used in computer science, mathematics, electrical engineering, logic, psychology and other specialized fields. The model is essentially composed of states (including an initial state), input events, output events, and transition functions. A state, which can also be referred to as a current state, stores information about the past so that it reflects the input changes from the system start to the present moment. A transition function then takes the current state and an input event, or a series of input events, and returns a new set of output events and a next state, which in turn are acted upon by a new transition function generating a new set of output events and a new "next" state, the sequence continuously repeated until a single final or a series of final terminating states are achieved.

A review of the existing methods used to manipulate dial plans in gateways shows that their implementation can be cumbersome and expensive, requiring in many cases extensive computing resources and infrastructure. Therefore, there is a requirement for a method to manipulate dial plans requiring limited computing resources while providing fast accurate pattern-matching capabilities, and for a system by which to implement the method.

The foregoing examples of the related art and limitations related therewith are intended to be illustrative and not exclusive. Other limitations of the related art will become apparent to those of skill of the art upon a reading of the specification and a study of the figures.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

In accordance with some embodiments there is provided a dial plan parser which includes a state machine based upon a dial plan.

In accordance with additional embodiments there is provided a dial plan parser which includes a state machine based upon a dial plan wherein the dial plan is embodied within a dial plan configuration file.

In accordance with some embodiments there is provided a dial plan parser which includes a state machine based upon a dial plan, and control logic adapted to apply call signaling data to the state machine.

In accordance with additional embodiments there is provided a dial plan parser which includes a state machine based upon a dial plan, and control logic adapted to apply call signaling data to the state machine. The control logic is adapted to receive an indication of expected call signaling digits from said state machine.

In accordance with additional embodiments there is provided a dial plan parser which includes a state machine based upon a dial plan wherein the dial plan is embodied within a dial plan configuration file. The dial plan includes dial prefixes and suffix lengths.

In accordance with some embodiments there is provided a dial plan parser which includes a state machine based upon a dial plan, wherein the state machine includes a set of rules based on dial prefixes.

In accordance with some embodiments there is provided a dial plan parser which includes a state machine based upon a dial plan, wherein the state machine resets to an initial state upon a dialing rule violation.

In accordance with additional embodiments there is provided a dial plan parser which includes a state machine based upon a dial plan wherein the dial plan is embodied within a dial plan configuration file. The dial plan configuration embodies multiple dial plans.

In accordance with additional embodiments there is provided a dial plan parser which includes a state machine based upon a dial plan, wherein the state machine includes a set of rules based on dial prefixes. The rules are implemented in the state machine in a compressed form.

In accordance with some embodiments there is provided a method of parsing a call including applying call signaling data to a state machine configured upon a dial plan.

In accordance with some embodiments there is provided a method of parsing a call including applying call signaling data to a state machine configured upon a dial plan. The method further includes determining an expected number of call signaling digits based on an output of the state machine.

In accordance with additional embodiments there is provided a method of parsing a call including applying call signaling data to a state machine configured upon a dial plan, wherein the dial plan is embodied with a dial plan configuration file.

In accordance with some embodiments there is provided a method of parsing a call including applying call signaling data to a state machine configured upon a dial plan, wherein the dial plan is embodied with a dial plan configuration file. The dial plan is based on dial prefixes and suffix lengths.

In accordance with some embodiments there is provided a method of parsing a call including applying call signaling data to a state machine configured upon a dial plan, wherein a set of rules are developed for the state machine based on dial prefixes.

In accordance with some embodiments there is provided a gateway which includes a dial plan parser including a state machine configured upon a dial plan, and a call routing module/switch adapted to transfer a call to a next point.

In accordance with additional embodiments there is provided a gateway which includes a dial plan parser including a state machine configured upon a dial plan, and a call routing module/switch adapted to transfer a call to a next point. The gateway is adapted to start a routing process before dialing has been completed In accordance with additional embodiments there is provided a gateway which includes a dial plan parser including a state machine configured upon a dial plan, and a call routing module/switch adapted to transfer a call to a next point. The gateway is adapted to keep track of only one dialed number at any given time.

In accordance with additional embodiments there is provided a gateway which includes a dial plan parser including a state machine configured upon a dial plan, and a call routing module/switch adapted to transfer a call to a next point. The gateway is provisioned with the state machine rules through the gateway's administration interfaces.

In accordance with some embodiments there is provided a gateway which includes a dial plan parser including a state machine configured upon a dial plan, and a call routing module/switch adapted to transfer a call to a next point. The gateway is adapted to manage multiple dial plans.

In accordance with some embodiments there is provided a gateway which includes a dial plan parser including a state machine configured upon a dial plan, and a call routing module/switch adapted to transfer a call to a next point. The gateway is adapted to reset to an initial state upon a dialing violation occurring.

In addition to the exemplary aspects and embodiments described above, further aspects and embodiments will become apparent by reference to the figures and by study of the following detailed descriptions.

BRIEF DESCRIPTION OF THE DRAWINGS

Exemplary embodiments are illustrated in referenced figures and drawings. It is intended that the embodiments and figures disclosed herein are to be considered illustrative rather than restrictive.

FIG. 7 illustrates an exemplary table of rules for a finite state machine.

DETAILED DESCRIPTION

Figure 1:
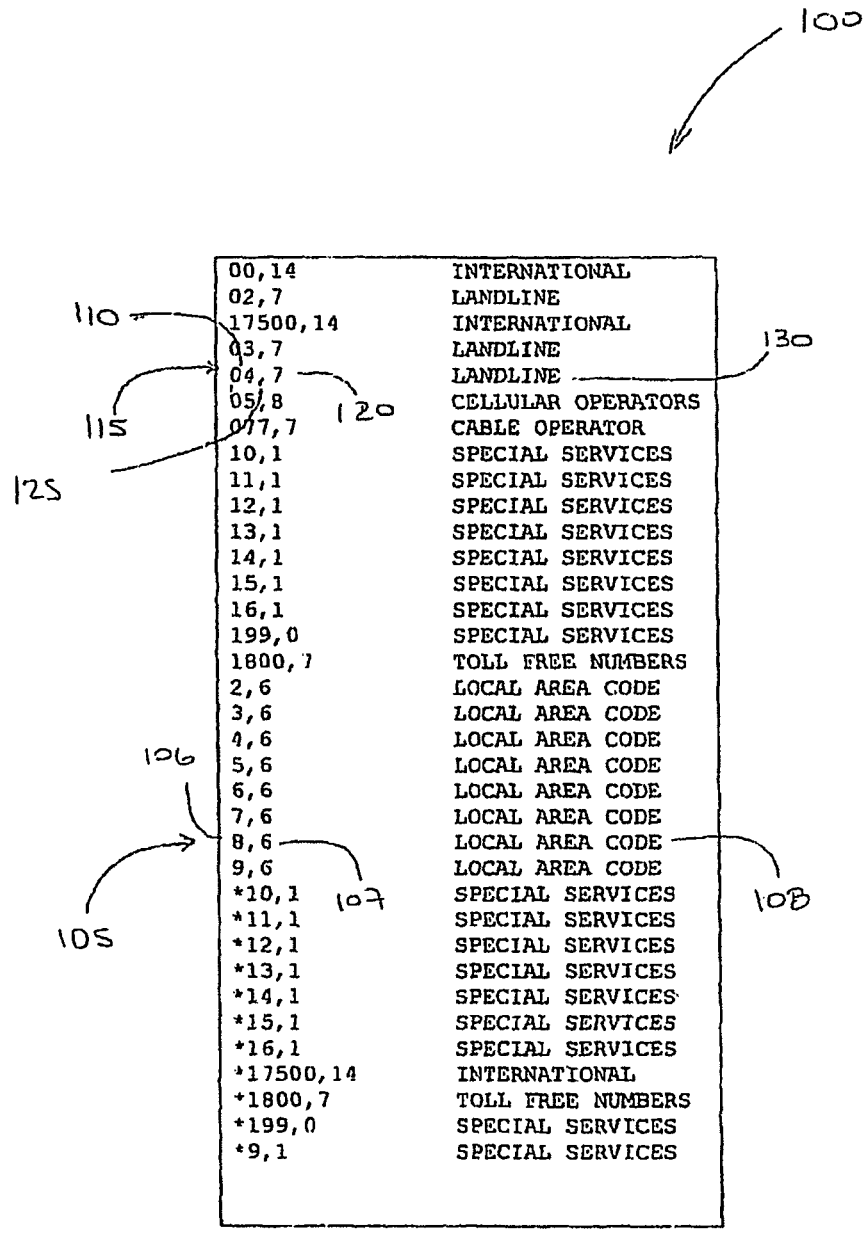
FIG. 1 illustrates an exemplary short dial plan.

Reference is made to FIG. 1 which illustrates an exemplary short dial plan (100). A typical dial plan for a typical gateway, which may include the exemplary short dial plan (100) shown, more generally includes thousands of lines (115) wherein each line (115) consists of a dialing prefix (110) and a suffix length (120), the combination of the dialing prefix (110) and suffix length (120) hereinafter may be referred to as call signaling data. Optional textual routing information (130) may be included in the line (115). The dialing prefix (110), which may be an area code for a region, for example "04", an international access code, for example "00", a special services code, for example, "10", a local area code, for example "7", a mobile, which may be interchangeably referred to as cellular, phone code, for example "05", or any other type of code generally employed in the PSTN to initiate telephone calls, is separated from the suffix length (120) by a comma (125), although in other embodiments of the present disclosure some other delimiter may be used, for example a hyphen, "-". The suffix length (120), which may be interchangeably referred to as call signaling digits, represents the number of digits expected to be dialed following the dial prefix (110), For example, in line (105), dialing the dial prefix "8" (106) which is a local area code (108) indicates that the call is a local call and the dial prefix will be followed by dialing a suffix length of 6 digits (107).

Figure 2:
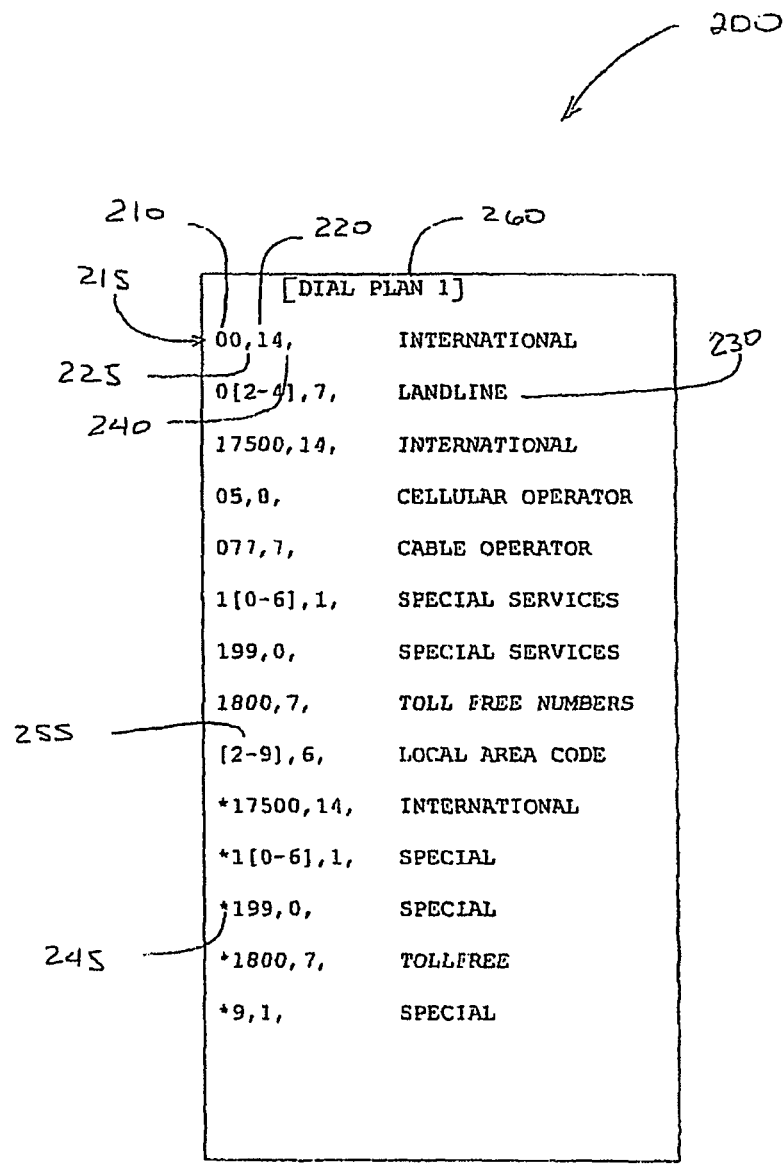
FIG. 2 illustrates an exemplary dial plan configuration file for the exemplary dial plan shown in FIG. 1.

All dial plans may generally be reconfigured into a dial plan configuration file which is essentially a new format so as to reduce the number of lines included in the dial plan. Reference is made to FIG. 2 which illustrates an exemplary dial plan configuration file (200) for the exemplary dial plan (100) referenced in FIG. 1. The rules governing the preparation of the dial plan configuration file (200) are detailed below.

In the dial plan configuration file (200) every line (215) defines a known dial prefix (210), which may be similar or the same to the dial prefix (110) shown in FIG. 1, and the number of digits expected to follow the dial prefix (210), referred to as the suffix length (220), which may be the same or similar to the suffix length (120) shown in FIG. 1. The dial prefix (210) is separated from the suffix length by a comma (225), although in other embodiments of the present disclosure some other delimiter may be used, for example, a hyphen, "-". A textual routing label (230), which may be similar or the same as the textual routing label (130) shown in FIG. 1, may be optionally appended to the line, separated from the suffix length (220) by another comma (240). Empty lines are ignored. Multiple dial plans may be specified in one dial plan configuration file by listing the name of the dial plan in square brackets, for example [Dial Plan 1] (260), which indicates the start of a new dial plan.

The dial plan configuration file (200) may include in the dial prefix (210) asterisks "*" (245) and numeric signs "#" (not shown). Numeric ranges (255) may also be included in the dial prefix (210). Numeric ranges (not shown) may be included as part of the suffix length (220).

The rules described above for preparing a dial plan configuration file from a dial plan are not limited to the dial plan illustrated in FIG. 1 and the dial plan configuration file in FIG. 2. They are equally applicable for preparing dial plan configurations file from essentially any type and size of dial plan.

Figure 3:
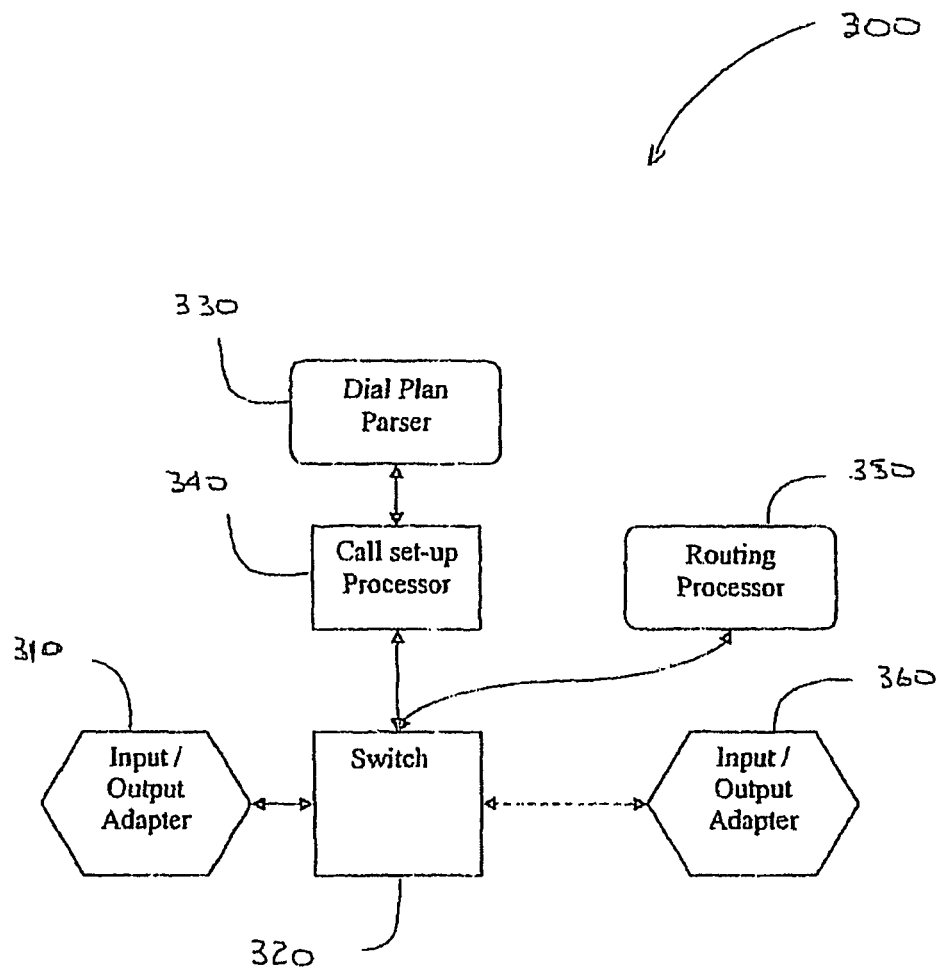
FIG. 3 schematically illustrates an exemplary gateway.

Reference is made to FIG. 3 which schematically illustrates an exemplary gateway (300), which may be interchangeably referred to as a call routing system, in a typical telecommunications network, for example a PSTN, although it may be any other type of telecommunications network, including, for example a VoIP network, the network including a Dial Plan Parser (330). The gateway (300) includes a Switch (320), which may also be referred to as a call routing module/switch, and includes a number of electronic hardware and software components, which directs telephone calls received through input/output adapters, such as Input/Output Adapter (310) or Input/Output Adapter (360). The input/output adapters may be plug-in modules in the Switch (320), although they may also be stand-alone modules in other embodiments of the present disclosure Input/Output Adapter (310) and Input/Output Adapter (360) are input/output adapters used for connecting the gateway, to one or more means of telephone call transport, for example, analog telephone, ISDN line, CAS E-1 trunk, Synchronous Transmission Module (STM-1) optical link, VoIP interface, and Asynchronous Transfer Mode (ATM), although many other means of telephone call transport may be used. In a single gateway a plurality of concurrent connections may be used, for example, 2-1000, 1001-10000, 10001-30000, 30001-100000, 100001 or more, through the input/output adapters.

The gateway (300) includes a Call Set-up Processor (340) which is a processor subsystem residing within the electronic hardware of the Switch (320), although in other embodiments of the present disclosure the Call Set-up Processor (340) may also reside external to the Switch (320). The Call Set-up Processor (340) includes an application software which enables handling the interaction between the originator (not shown) of the telephone call and the receiver (not shown) of the telephone call at the other ends of the Input/Output Adapter (310) and Input/Output Adapter (360), and includes functions such as producing dial tones, collecting dialed digits, and connecting the relevant parties to the call.

A Routing Processor (350) is also included in the gateway (300) and is a processor subsystem residing within the electronic hardware of the Switch (320), although in other embodiments of the present disclosure the Routing Processor (350) may also reside external to the Switch (320). The Routing Processor (350) is responsible for locating the receiver on the telephone network, and may be adapted with an external link to other gateways on other telecommunication networks, for example PSTN or a VoIP network, although the external link may be to any other type of telecommunications network. The Routing Processor (350) is generally activated after dialing is completed.

The gateway (300) further includes a Dial Plan Parser (330) which interacts directly with the Call Set-up Processor (340) when handling a telephone call. The Dial Parser (330) is configured from a dial plan and/or dial plan configuration file, which may include but not be limited to the dial plan (100) shown in FIG. 1 and the dial plan configuration file (200) shown in FIG. 2 respectively, and includes control logic (not shown) adapted with a finite state machine (not shown), hereinafter referred to as state machine, to handle phone number patterns based on the dial plan and/or dial plan configuration file. Particularly, the Dial Parser (330) is adapted with a state machine to estimate the number of call signaling digits which will follow the dial prefix.

Figure 4:
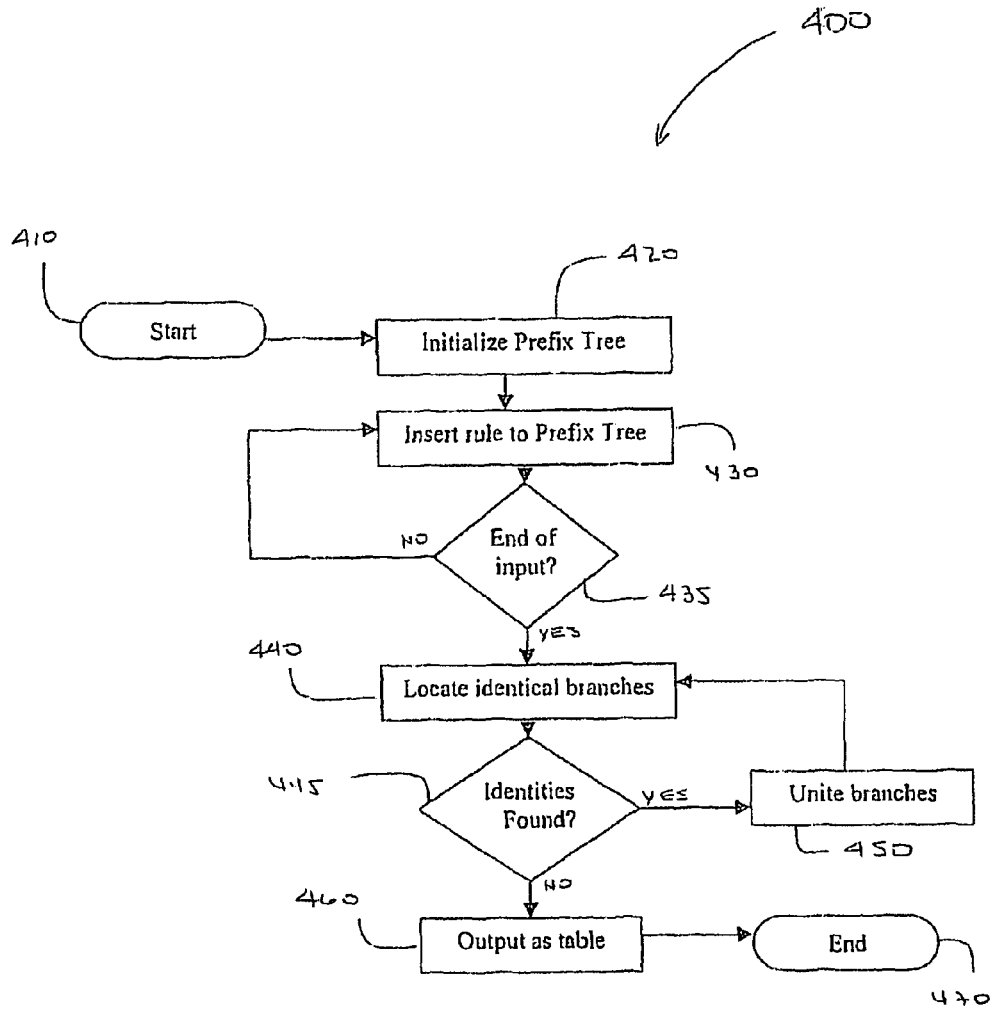
FIG. 4 schematically illustrates a flow diagram of a Dial Plan Parser pre-processing algorithm.

In order to create the state machine a pre-processing algorithm is executed one-time on each dial plan specified in a dial plan configuration file. Reference is made to FIG. 4 which schematically illustrates a flow diagram of a Dial Parser pre-processing algorithm (400), hereinafter referred to as algorithm, which is used to create the state machine. The algorithm (400) is installed on the gateway hardware, although in other embodiments of the present disclosure, the algorithm may be external to the gateway hardware and may run on a personal desktop computer or other type of external processor, including a lap-top computer, the resulting state machine then implemented in the Dial Plan Parser. The algorithm (400) reads the rules of the dial plan or the dial plan configuration file, arranges them in a tree structure, hereinafter referred to as a "prefix" tree or tree, applies compression by detecting and uniting identical branches, that is, by breaking the tree structure and forming a directed-graph in its place, and then outputs the resulting data structure in table form. The rules are essentially defined by the dial prefix and the suffix length in each line.

Figure 5:
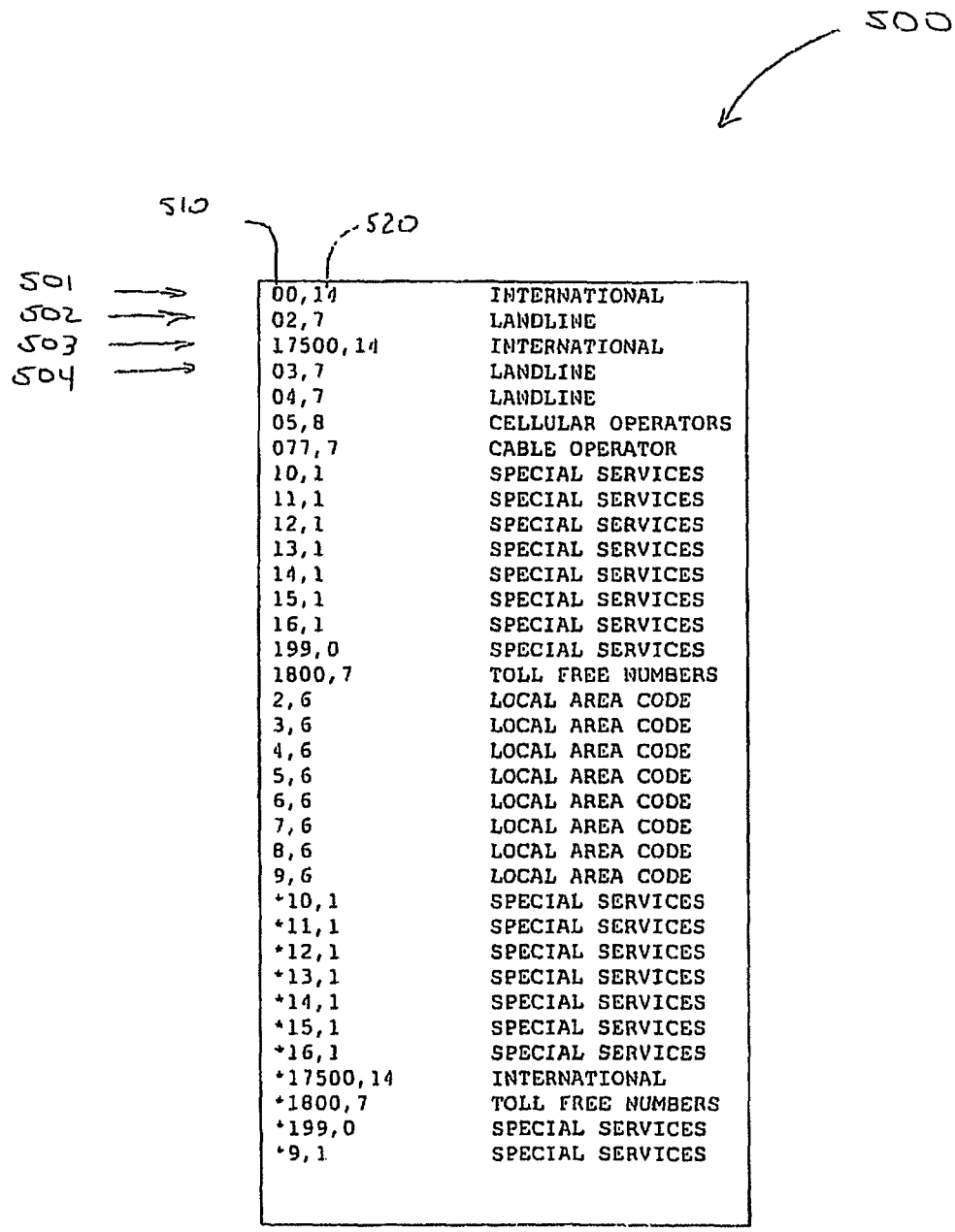
FIG. 5 illustrates the exemplary dial plan shown in FIG. 1.

Reference is also made to FIG. 5 which illustrates the exemplary dial plan shown in FIG. 1, and to FIGS. 6A, 6B, 6C, 6D, and 6E which schematically illustrate the execution of the algorithm (400) to form a tree (600), for line (501), line (502), line (503) and line (504) of the exemplary dial plan (500) of FIG. 5. FIG. 6F schematically illustrates the execution of the algorithm (400) to form a tree (600) for the whole exemplary dial plan (500) in FIG. 5.

Start (410)—This step includes reading the rules of the dial plan, for example reading the rules of dial plan (500) of FIG. 5, the dial prefix (510) and the suffix length (520).

Figure 6A:
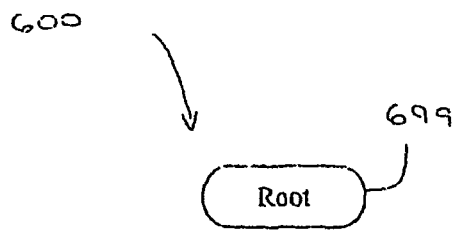
FIG. 6A schematically illustrates a root of a tree structure of the exemplary dial plan shown in FIG. 5.

Initialize Prefix Tree (420)—This step is shown in FIG. 6A; the initial tree (600) is empty so that there are no branches attached to the Root (699).

Figure 6B:
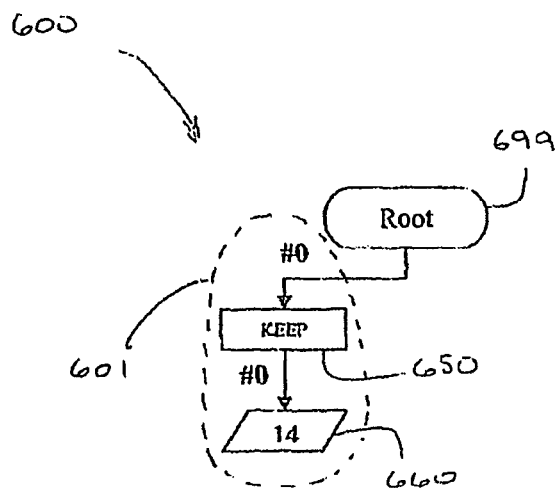
FIG. 6B schematically illustrates a tree structure for a first line in the exemplary dial plan shown in FIG. 5.

Insert Rule to Prefix Tree (430)—In this step the dial prefixes in each line of the dial plan are laid out in a tree structure, the digits in the dial prefix forming links. Each branch includes one or more links, and terminates in a node which includes the suffix length corresponding to the line in the dial plan from which the dial prefix was obtained. This step is shown in FIG. 6B; the root (699) is shown with branch (601), which corresponds to the dial prefix (510) and suffix length (520), or rule, of line (501) in dial plan (500). The first and the second digit "0" are obtained from the dial prefix (510) while the node (660) contains the suffix length (520), "14".

The step KEEP LOOKING (650) in FIG. 6B indicates, that while creating the tree (600), the algorithm (400) requires more digits to make a decision as a single digit "0" is not listed as a dial prefix. Once the second digit "0" is received the "00" combination corresponds to the rule in line (501) of the dial plan (500) and it is therefore known that 14 digits will follow the "00" in order to complete the telephone call, identified by node (660).

End of Input (435)—In this step there is a determination as to whether or not more inputs are required to solve the tree.

Figure 6C:
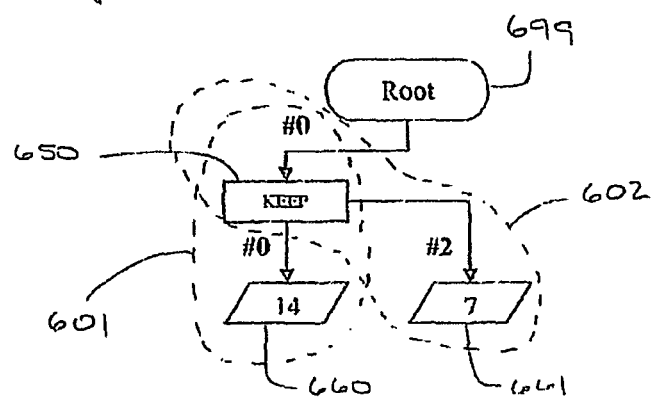
FIG. 6C schematically illustrates a tree structure for the first line and a second line in the exemplary dial plan shown in FIG. 5.

FIG. 6C illustrates the tree (600) of FIG. 6B after the insertion of the rule in line (502) of the dial plan (500) which corresponds to branch (602). The tree (600) now includes root (699), the step KEEP LOOKING (650), branch (601) and branch (602), the branches corresponding to the rules of line (501) and (502), respectively, in dial plan (500). In this case, once the second digit #2 is received the "02" combination corresponds to the rule in line (502) of the dial plan (500) and it is therefore known that 7 digits will follow the "02", node (661) in order to complete the call.

Figure 6D:
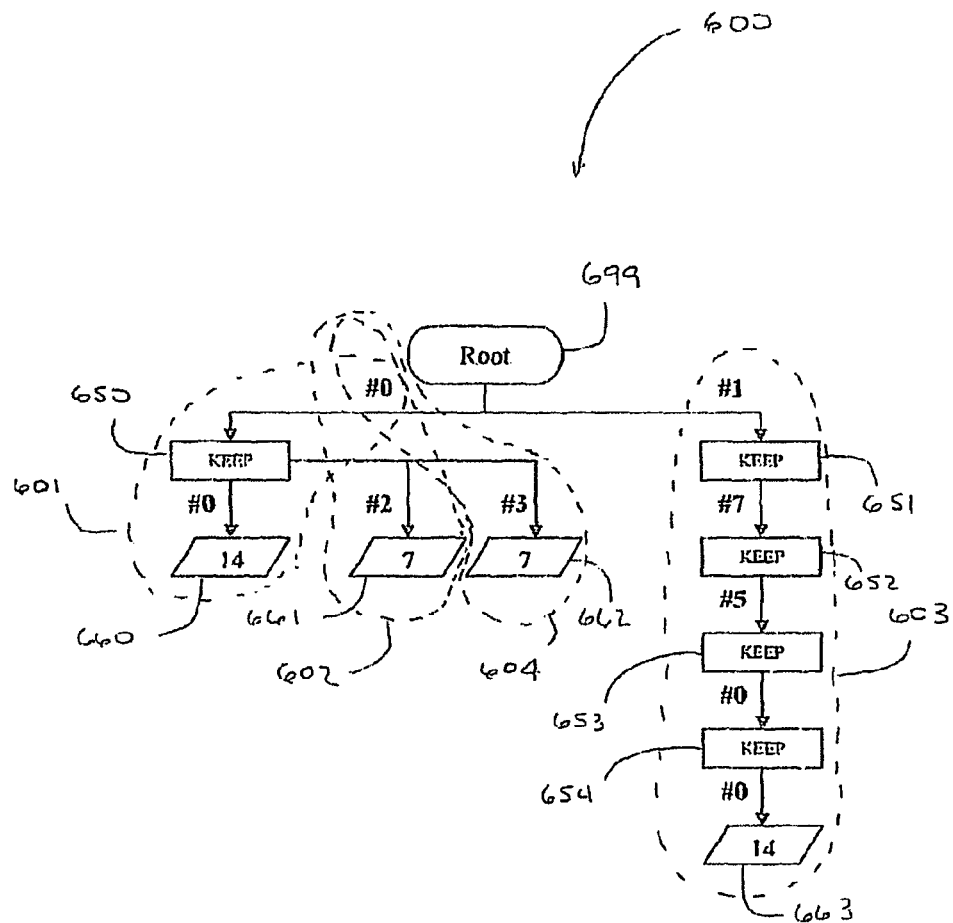
FIG. 6D schematically illustrates a tree structure for the first line, the second line, a third line and a fourth line in the exemplary dial plan shown in FIG. 5.

FIG. 6D illustrates the tree (600) in FIG. 6C after the insertion of the rules in line (503) and line (504) of the dial plan (500), which correspond to branch (603) and branch (604). The tree (600) now includes the root (699), node (660), node (661), node (662), node (663), the steps KEEP LOOKING (650, 651, 652, 653, 654), branch (601), branch (602), branch (603) and branch (604), the branches corresponding to the rules of line (501), line (502), line (503) and line (504), respectively, in dial plan (500). In the case of branch (603), a digit #1 is received but more information is required as there is no single digit dial prefix in the dial plan (500) with the digit #1. Therefore, it is necessary to KEEP LOOKING (651) for another digit. A second digit #7 is received but there is still not enough information as there is no dial prefix "17" in the dial plan (500) Therefore, it is necessary to KEEP LOOKING (652) for another digit. A third digit, #5 is received but there is still not enough information as there is no dial prefix "175" in the dial plan (500). Therefore, it is necessary to KEEP LOOKING (653) for another digit. A fourth digit, #0 is received but there is still not enough information as there is no dial prefix "1750" in the dial plan (500). Therefore, it is necessary to KEEP LOOKING (654) for another digit. A fifth digit, #0 is received which corresponds to the rule of line (503) in dial plan (500), and so it is now known that 14 digits must follow the dial prefix "17500" in order to complete the call, identified by node (663). In the case of the branch (604) a second digit #3 is received following the KEEP LOOKING (650) so that the "03" combination corresponds to the rule in line (504) of the dial plan (500) and it is therefore known that 7 digits will follow the "02" in order to complete the call, identified by node (662).

Locate Identical Branches (440)—This step involves going through all branches in the tree and identifying all various branches which have similar links and/or terminate with nodes having the same value. Referring to FIG. 6D, branch (602) and branch (604) terminate in node (660) and node (662), respectively, containing a suffix length 7. Branch (601) and branch (603) have a last link #0 and terminate in node (660) and (663) respectively, containing the suffix length 14.

Identities Found (445)—In this step there is a determination as to whether or not identical branches are identified, which are defined by branches which terminate in a node containing the same digit. If there are identical branches identified then the algorithm moves on to the next step in which they are combined.

Unite Branches (450)—The algorithm compresses the tree by repeatedly identifying identical branches and eliminating redundancy. Referring to FIG. 6D node (662) containing the suffix length 7 is eliminated in branch (604) and the branch (604) is connected to node (661) of branch (602) which also contains the suffix length 7. Node (663) containing the suffix length 14 in branch (603) is eliminated and the branch (603) is connected to node (660) of branch (601).

Figure 6E:
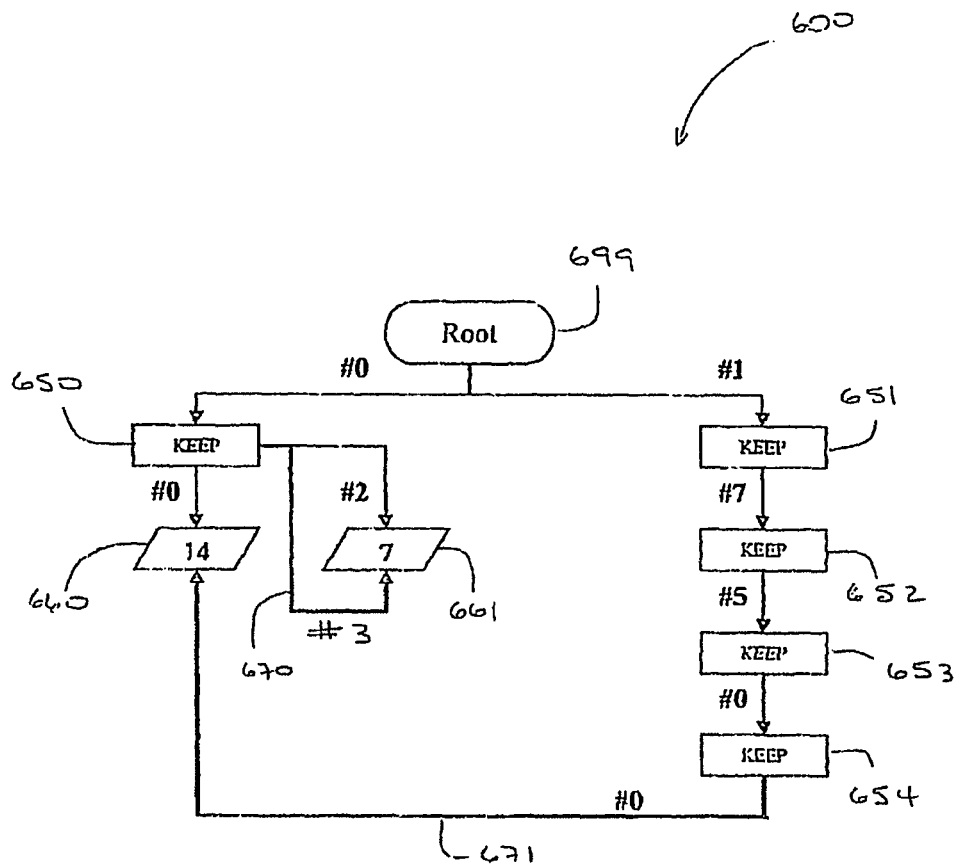
FIG. 6E schematically illustrates a compressed tree structure of the tree structure shown in FIG. 6D.
Figure 6F:
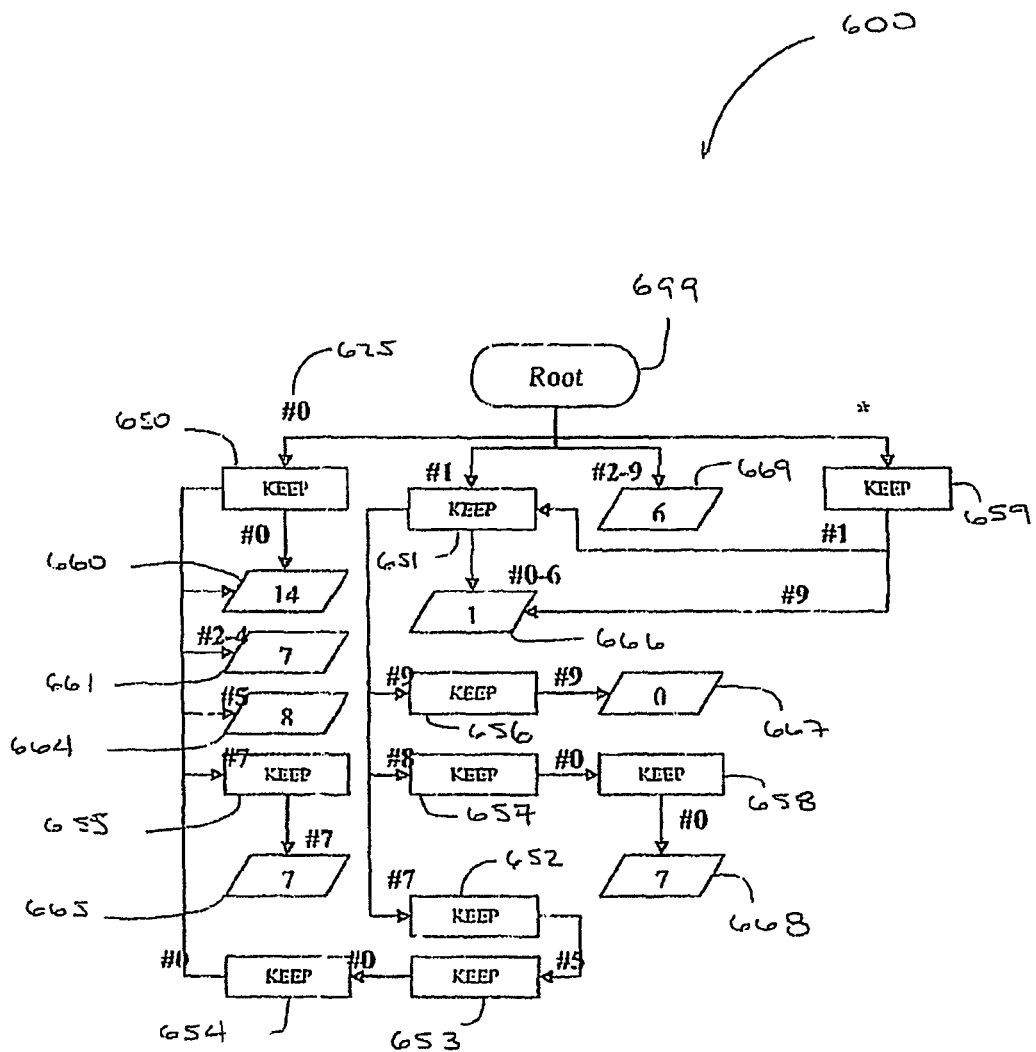
FIG. 6F schematically illustrates a compressed tree structure of the dial plan shown in FIG. 5.

The result of the elimination of the nodes and the compression of the tree may be seen in FIG. 6E. Link (670) and link (671) are shown as connecting to node (661) containing the suffix length 7 and a node (660) containing the suffix length 14, respectively, thereby eliminating the redundancy in the number of nodes. The link (670) may be eliminated if the rule of the dial plan configuration file, "Numeric ranges may be included as part of the suffix length" is applied. The root (699) and the steps KEEP LOOKING (651, 652, 653, 654) remain from FIG. 6D and were not eliminated by the compression process.

Output as Table (460)—In this step the fully compressed tree generated by the execution of the algorithm is translated into tabular form, which may be referred to hereinafter as state machine (SM) rules or compressed dial plan. The SM rules essentially define a set of rules governing the operation of the SM. Every rule, which can be referred to interchangeably as state, defines an executable operation to be performed by the SM when a digit is dialed Processing always starts from an initial rule, identified as rule 0. For each concurrent dialing operation concurrently performed by each telephone caller, the gateway needs to keep track of only one number which corresponds to the current state, and so each dialed digit will cause a change of state. Returning to state 0 indicates that dialing has failed, that is, that there has been a dialing rule violation and that no such number exists in the dial plan. When a final state is reached, the expected telephone number length is known, making it possible for the routing process to start before dialing is completed.

Reference is made to FIG. 6F which illustrates the compressed tree (600) for all the rules in the exemplary dial plan (500), and to FIG. 7 which illustrates an exemplary SM rules (700), using the method described for the algorithm (400) illustrated in FIG. 4 based on the dial prefix and suffix lengths from the exemplary dial plan (500). A typical table of SM rules, as shown in exemplary SM rules (700), is generally arranged in grid form, a first vertical column identifies the rule or state (775), for example rule 0 (799), which corresponds to the root node (699) in FIG. 6. A second vertical column in the SM rules (700) defines the expected dialing string length (720), which corresponds with the suffix length (520) in FIG. 5, for each rule (775). A digit in the column represents an output from the state machine identifying the expected length of the dial string. For example, in rule 2 (760), the expected dialing length is 14 digits corresponding to node (660) in FIG. 6. A KEEP in the column, for example KEEP in rule 18 (759), is interpreted as more information being required and another digit must be input to the SM.

The headings of the additional vertical columns in the grid are the dial numbers (725) used in dialing telephone calls (0-9, *, #) and correspond to the digits in the links in FIG. 6 making up the dial prefix. The numbers appearing under the dial numbers (725) are vectors (723) referring to the state (775) which will provide the next input to the SM. For example, in rule 15 (756), when #9 (725) is dialed, the vector (723) points to the number "16" which refers go to rule 16 (767). Optionally included in the SM rules (700) may be textual routing information (730). The following list identifies the correspondence between the rules (775) of the SM rules (700) in FIG. 7 and the compressed tree (600) in FIG. 6F, and make up the rules of the SM.

Rule 0 (799) is associated with root (699)—more information is required as this is the initial state. Another number must be dialed.

Rule 1 (750) is associated with KEEP (650)—more information is required. Another number must be dialed.

Rule 2 (760) is associated with node (660)—14 digits are expected to follow the dial prefix.

Rule 3 (761) is associated with node (661)—7 digits are expected to follow the dial prefix.

Rule 4 (768) is associated with node (668)—8 digits are expected to follow the dial prefix.

Rule 5 (755) is associated with KEEP (655)—more information is required. Another number must be dialed.

Rule 6 (765) is associated with node (665)—7 digits are expected to follow the dial prefix.

Rule 7 (751) is associated with KEEP (651)—more information is required.

Rule 8 (761) is associated with node (661)—1 digit is expected to follow the dial prefix, special number.

Rule 9 (752) is associated with KEEP (652)—more information is required. Another number must be dialed.

Rule 10 (753) is associated with KEEP (653)—more information is required. Another number must be dialed.

Rule 11 (754) is associated with KEEP (654)—more information is required. Another number must be dialed.

Rule 12 (757) is associated with KEEP (657)—more information is required. Another number must be dialed.

Rule 13 (758) is associated with KEEP (658)—more information is required. Another number must be dialed.

Rule 14 (768) is associated with node (668)—7 digits are expected to follow the dial prefix.

Rule 15 (756) is associated with KEEP (656)—more information is required. Another number must be dialed.

Rule 16 (767) is associated with node (667)—no digits are expected to follow the dial prefix, special number.

Rule 17 (769) is associated with node (669)—6 digits are expected to follow the dial prefix.

Rule 18 (759) is associated with KEEP (659)—more information is required Another number must be dialed.

The following example illustrates how the SM rules (700) are applied when dialing the number 1-800-1234567

The first dialed digit is 1, rule 0 (710) has the vector (723) "7" under column header #1 (725) representing the dialed digit 1, so rule 7 (751) will now be processed.

The second dialed digit is 8, rule 7 (751) has the vector (723) "12" under column #8 (725) representing the dialed digit 8, so rule 12 (757) is next.

The third dialed digit is 0, rule 12 (757) has the vector (723) "13" under column #0 (725) representing the dialed digit 0, so rule 13 (758) is next.

The fourth dialed digit is 0, rule 13 (758) has the vector (723) "14" under column #0 (725) representing the dialed digit 0, so rule 14 (768) is next.

Rule 14 (768) has the number 7 in the expected dialing string length column (720). This indicates that the expected phone number is 7 digits in length.

In another embodiment of the present disclosure the gateway may support gradual replacement of a previously-loaded dial plan configuration file. The gateway may keep in memory the previously loaded file together with the new file; the gateway processes the new file for new dialing attempts while still allowing in-session dialing attempts, which were initially performed using the old dial plan configuration file, to complete. Following a period of time, the old file may be fully de-commissioned and may be deleted from the gateway's memory.

In an additional embodiment of the present disclosure several distinct dial plans may be defined in the dial plan configuration file, the selection of the appropriate dial plan for a given input in the Input/Output Adpaters pre-set in the gateway's configuration. The gateway may be under the control of an external network entity as may be, for example, the Media Gateway Controller described in ITU-T Recommendation H.248, or a comparable control protocol such that the external network entity (called a Media Gateway Controller in ITY-T Recommendation H.248) may specify the dial plan name in one of the commands sent to the gateway. For example, ITU-T Recommendation H.248 may support the pre-set selection of the dial plan in an enhancement to the DigitMap descriptor. This method may allow selection of a different dial plan for every customer attached to the gateway.

While a number of exemplary aspects and embodiments have been discussed above, those of skill in the art will recognize certain modifications, permutations, additions, and sub-combinations thereof. It is therefore intended that the following appended claims and claims hereafter introduced be interpreted to include all such modifications, permutations, additions and sub-combinations as are within their true spirit and scope.

What is claimed is:

1. A dial plan parser comprising:
   a state machine based upon a dial plan,
   wherein the dial plan parser is (a) to receive as input a human-readable dial plan configuration file, (b) to parse the human-readable configuration file, and (c) to automatically generate as output, from the human-readable configuration file, a state machine comprising a machine-readable state table;
   wherein the dial plan parser is adapted with the state machine to estimate a number of call signaling digits which follow a dial prefix;
   wherein the dial plan parser is implemented by utilizing at least a hardware component;
   wherein an output from the state machine comprises an expected dialing length;
   wherein the dial plan parser is associated with a call routing module which is able, based on the expected dialing length, to begin call routing before dialing is completed.

2. The dial plan parser according to claim 1, wherein the dial plan is embodied within said dial plan configuration file, wherein the dial plan parser is to automatically transform a telephone number plan, which comprises known prefixes, into a machine-readable state table.

3. The dial plan parser of claim 2, wherein said dial plan configuration file embodies multiple dial plans.

4. The dial plan parser according to claim 1, further comprising control logic adapted to apply call signaling data to said state machine,
   wherein the dial plan parser is to apply an algorithm which automatically: (A) reads a plurality of rules of said dial plan configuration file; (B) arranges said rules in a tree structure representing a prefix tree; (C) applies prefix tree compression by detecting and uniting identical branches of said prefix tree; (D) forms a directed graph to replace said prefix tree; (E) produces as output a machine-readable state table which corresponds to said directed graph.

5. The dial plan parser according to claim 3, wherein said control logic is further adapted to receive an indication of expected call signaling digits from said state machine.

6. The dial plan according to claim 1, wherein said dial plan consists only of dial prefixes and suffix lengths,
   wherein the dial plan parser is (A) to read a plurality of rules of said dial plan configuration file, wherein said rules are defined by dial prefix and by suffix length per each line; and (B) based on said rules, to automatically compute transitions between states in the machine-readable state table.

7. The dial plan parser according to claim 1, wherein said state machine comprises a set of rules based on dial prefixes,
   wherein the dial plan parser and the call routing module are associated with a gateway adapted to gradually replace a previously-loaded dial plan configuration file, by (a) keeping in memory the previously-loaded dial plan configuration file together with a new dial plan configuration file, (b) processing the new configuration file for new dialing attempts while still allowing in-session dialing attempts which were initially performed using the previously-loaded dial plan configuration file, and (c) after a period of time, fully de-commissioning the previously-loaded dial plan configuration file.

8. The dial plan parser according to claim 7, wherein said rules are implemented in the state machine in a compressed form.

9. The dial plan parser according to claim 1, wherein said state machine resets to an initial state upon a dialing rule violation.

10. A method of parsing and routing a call, the method comprising:
parsing a dial plan by automatically generating a state machine based upon a dial plan, wherein the parsing comprises: (a) receiving as input a human-readable dial plan configuration file, (b) parsing the human-readable configuration file, and (c) automatically generating as output, from the human-readable configuration file, a state machine comprising a machine-readable state table;
applying call signaling data to said state machine;
adapting a dial plan parser with the state machine to estimate a number of call signaling digits which follow a dial prefix, wherein an output from the state machine comprises an expected dialing length;
based on the expected dialing length, beginning call routing before dialing is completed.

11. The method according to claim 10, wherein the parsing comprises: automatically transforming a telephone number plan, which comprises known prefixes, into a machine-readable state table;
wherein the method further comprises: determining an expected number of call signaling digits based on an output of the state machine.

12. The method according to claim 10, wherein said dial plan is embodied within said dial plan configuration file,
wherein the parsing comprises automatically: (A) reading a plurality of rules of said dial plan configuration file; (B) arranging said rules in a tree structure representing a prefix tree; (C) applying prefix tree compression by detecting and uniting identical branches of said prefix tree; (D) forming a directed graph to replace said prefix tree; (E) producing as output a machine-readable state table which corresponds to said directed graph.

13. The method according to claim 10, wherein said dial plan consists of only dial prefixes and suffix lengths,
wherein the parsing comprises: (A) reading a plurality of rules of said dial plan configuration file, wherein said rules are defined by dial prefix and by suffix length per each line; and (B) based on said rules, automatically computing transitions between states in the machine-readable state table.

14. The method according to claim 10, comprising:
developing a set of rules for the state machine based on dial prefixes;
wherein the method comprises gradually replacing a previously-loaded dial plan configuration file, by (a) keeping in a memory of a gateway the previously-loaded dial plan configuration file together with a new dial plan configuration file, (b) processing the new configuration file for new dialing attempts while still allowing in-session dialing attempts which were initially performed using the previously-loaded dial plan configuration file, and (c) after a period of time, fully de-commissioning the previously-loaded dial plan configuration file.

15. A gateway comprising:
a dial plan parser comprising a state machine configured upon a dial plan;
wherein the dial plan parser is (a) to receive as input a human-readable dial plan configuration file, (b) to parse the human-readable configuration file, and (c) to automatically generate as output, from the human-readable configuration file, a state machine comprising a machine-readable state table; and
a call routing module adapted to transfer a call to a next point;
wherein the dial plan parser is adapted with the state machine to estimate a number of call signaling digits which follow a dial prefix;
wherein an output from the state machine comprises an expected dialing length;
wherein the call routing module is able, based on the expected dialing length, to begin call routing before dialing is completed.

16. The gateway according to claim 15,
wherein the dial plan parser is to automatically transform a telephone number plan, which comprises known prefixes, into a machine-readable state table;
wherein said gateway is adapted to start a routing process before dialing is completed.

17. The gateway according to claim 15, wherein said gateway is adapted to keep track of only one dialed number at any given time,
wherein the dial plan parser is to apply an algorithm which automatically: (A) reads a plurality of rules of said dial plan configuration file; (B) arranges said rules in a tree structure representing a prefix tree; (C) applies prefix tree compression by detecting and uniting identical branches of said prefix tree; (D) forms a directed graph to replace said prefix tree; (E) produces as output a machine-readable state table which corresponds to said directed graph.

18. The gateway according to claim 15, wherein said gateway is provisioned with the state machine rules through administration interfaces of the gateway;
wherein the dial plan parser is (A) to read a plurality of rules of said dial plan configuration file, wherein said rules are defined by dial prefix and by suffix length per each line; and (B) based on said rules, to automatically compute transitions between states in the machine-readable state table.

19. The gateway according to claim 15, wherein said gateway is adapted to manage a plurality of distinct dial plans defined in said dial plan configuration file;
wherein the gateway is adapted to gradually replace a previously-loaded dial plan configuration file, by (a) keeping in memory the previously-loaded dial plan configuration file together with a new dial plan configuration file, (b) processing the new configuration file for new dialing attempts while still allowing in-session dialing attempts which were initially performed using the previously-loaded dial plan configuration file, and (c) after a period of time, fully de-commissioning the previously-loaded dial plan configuration file.

20. The gateway according to claim 15, wherein said gateway is adapted to reset to an initial state upon occurrence of a dialing violation.

* * * * *